(12) United States Patent
Witte

(10) Patent No.: US 7,415,935 B2
(45) Date of Patent: Aug. 26, 2008

(54) SYSTEM FOR DETERMINING THE AIR FLOW CONDITIONS AROUND ONE OR MORE SAILS

(75) Inventor: Stefan Witte, Västra Frölunda (SE)

(73) Assignee: Wings AB, Gothenburg (SE)

( * ) Notice: Subject to any disclaimer, the term of this patent is extended or adjusted under 35 U.S.C. 154(b) by 0 days.

(21) Appl. No.: 10/556,458

(22) PCT Filed: May 11, 2004

(86) PCT No.: PCT/SE2004/000710
§ 371 (c)(1),
(2), (4) Date: Oct. 31, 2006

(87) PCT Pub. No.: WO2004/099790
PCT Pub. Date: Nov. 18, 2004

(65) Prior Publication Data
US 2007/0089658 A1    Apr. 26, 2007

(30) Foreign Application Priority Data
May 12, 2003    (SE) .................................... 0301378

(51) Int. Cl.
*B63H 9/04*    (2006.01)
*G01F 1/68*    (2006.01)

(52) U.S. Cl. ................................ 114/102.1; 73/204.27
(58) Field of Classification Search ............... 114/102.1
See application file for complete search history.

(56) References Cited

U.S. PATENT DOCUMENTS

| 3,789,793 A | 2/1974 | Keim |
| 5,477,424 A * | 12/1995 | Mocha ....................... 362/555 |
| 5,877,415 A | 3/1999 | Kruse |
| 7,143,363 B1 * | 11/2006 | Gaynor et al. ............... 715/771 |

FOREIGN PATENT DOCUMENTS

FR    2 633 717    1/1990

* cited by examiner

*Primary Examiner*—Jesús D Sotelo
(74) *Attorney, Agent, or Firm*—Nixon & Vanderhye, PC

(57) ABSTRACT

The invention relates to a system adapted for sailors in order to determine the air flow conditions around one or more sails, in conjunction with which both sides of the sails are equipped with a number of ultrasonic sensors that are distributed over the surface and communicate the flow conditions in their vicinity to a central unit.

10 Claims, 2 Drawing Sheets

SYSTEM FOR DETERMINING THE AIR FLOW CONDITIONS AROUND ONE OR MORE SAILS

This application is the U.S. national phase of international application PCT/SE2004/000710 filed 11 May 2004, which designated the U.S. and claims priority to SE 0301378-6 filed 12 May 2003, the entire contents of each of which are hereby incorporated by reference.

The present invention relates to a system that is adapted for sailors in order to determine the air flow conditions around one or more sails, in conjunction with which both sides of the sails are equipped with a number of sensors that are distributed over the surface and communicate the flow conditions in their vicinity to a central unit.

When sailing, the flow of the wind over the sails is observed by visual and manual means. Yarn threads or thin tapes, known as telltales, attached at different points and in particular at different heights along the leading edge of the sail, where the flow conditions are critical, are often used as an aid. The problem is simply that such yarn threads are difficult to observe. They are often concealed by other sails, or they may be situated on the rear side of the sail that it is wished to observe. Observation is extra difficult in the evening or at night when it is dark.

The principal object of the present invention is to resolve the aforementioned problem in such a way that the observations are easier to perform and are presented in a comprehensive fashion, and to utilize the information obtained in order to arrive at the best sailing result.

The aforementioned object is achieved by providing the surfaces of the sail with sensors/detectors of the ultrasonic type which indicate the direction and velocity of the air flow at the points at which they are applied.

Figure 1:
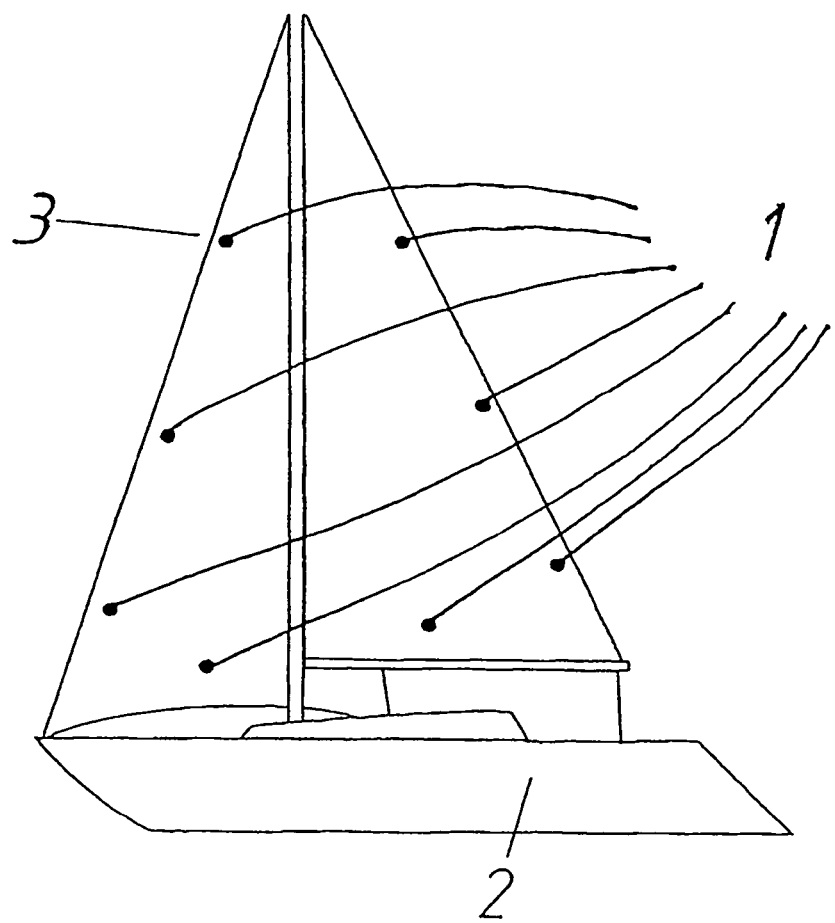
FIG. 1 shows a yacht with sensors arranged in the sail.
Figure 2:
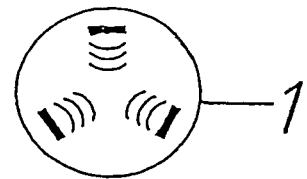
FIG. 2 shows an enlarged schematic illustration of a sensor arrangement of the ultrasonic type.
Figure 3:
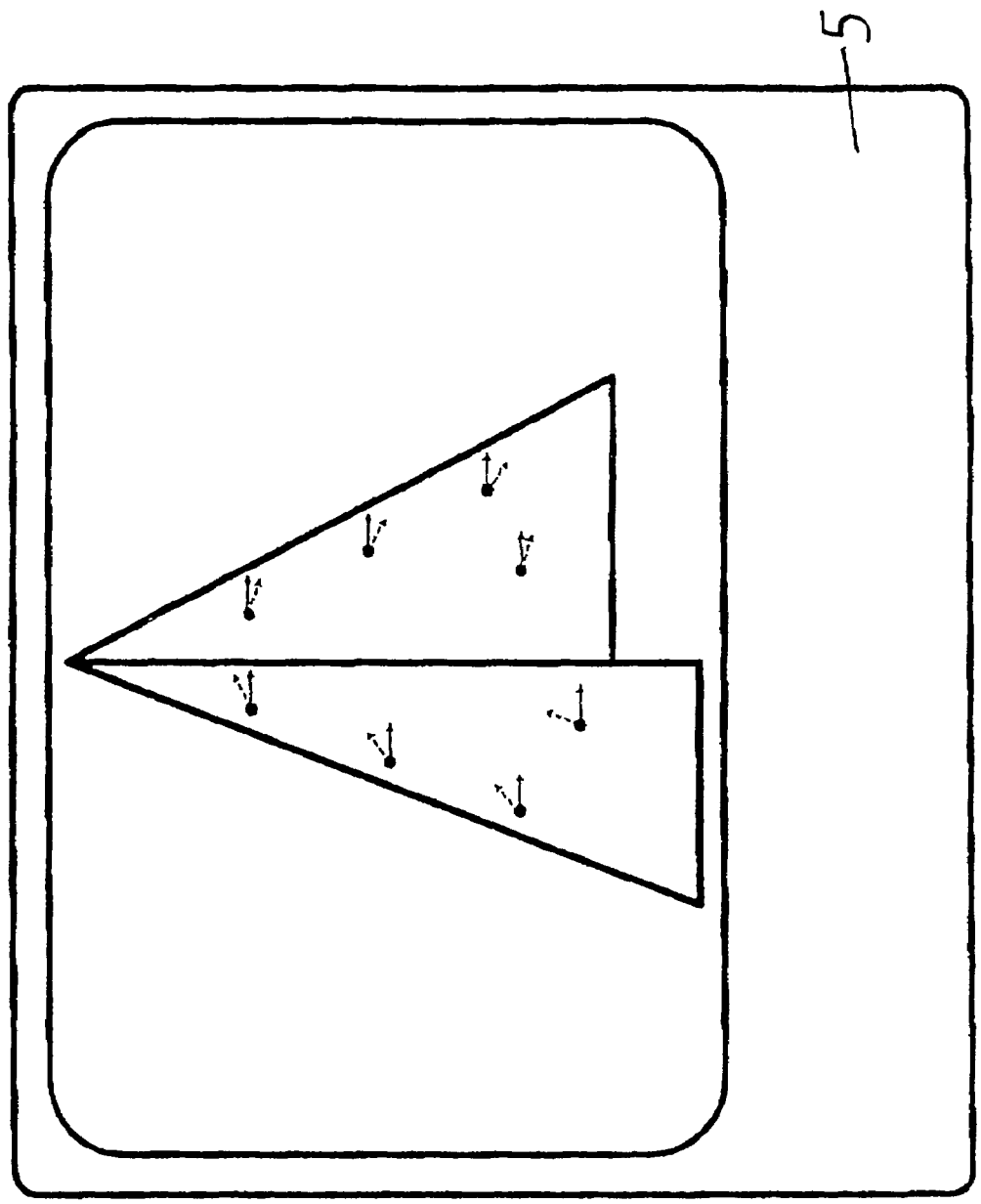
FIG. 3 shows a schematic illustration of how the presentation of the wind conditions takes place on a central unit.

In accordance with the present invention, which relates to a system that is adapted for use by sailors in order to determine the wind direction and, in appropriate cases, also the wind strength, involves the measurement by means of a number of detectors 1, for example capacitive micromechanical ultrasonic detectors in the form of transmitters and receivers, of the direction of the wind in question as it passes closely over them. More specifically, a number of detectors 1 is distributed along the sail 3 on a yacht 2 of the kind in question. These detectors 1 are positioned at a mutual distance from one another and are connected to an associated processor unit. The sensors 1 are preferably of a type which consists of three transmitters and receivers of the ultrasonic type arranged in the form of a triangle. These can be made very small so that they do not significantly disturb the function or manageability of the sail. They can also be encapsulated to enable them to withstand the weather and water. The three transmitter/receivers transmit ultrasonic signals to one another. The time taken by these signals to pass between the different points of the triangle and/or the change in frequency exhibited by the signals are evaluated with the help of electronics, which calculate the direction and velocity of the air flow at each sensor from this.

The information from the sensors is transmitted to a central unit 5, where it is finally processed into a presentation image or is relayed for automatic sail control. Transmission from the sensors to the central unit can take place either with the help of electrical wires along the sail or by radio communication.

Presentation of the flow situation around the sail can take place with the help of a display screen, which either sits directly on the central unit or is positioned separately from this in a suitable position where it can be observed conveniently. In the simplest case, an image of the sail and an indication of how the telltales positioned at the various sensor locations would have been oriented can be displayed on the screen. In a more information-rich variant, the flow at each sensor can be represented by an arrow in the direction of the flow, the length of which arrow is determined by the velocity of the flow. Different colours can be used to facilitate the interpretation of the image. The flows on the starboard side can thus be marked with green arrows, and those on the port side with red arrows, for example. Alternatively, the flows over the windward side of the sail can be presented in one colour, while the flows over the leeward side of the sail can be represented in a different colour. In the case of a boat with several sails, the flow situation around all the sails can appropriately be presented on the same display screen.

The efficiency of a sail as the means of propulsion for a yacht is highly dependent on the path of the air flow over the surface of the sail. In order to achieve the optimum result, the aim is to ensure that the flow over the sail is as ideal as possible. The wind velocity and the course and speed of the boat in relation to the direction of the wind and the manner in which the sail is set and handled are significant factors. The equipment and the degree of freedom at one's disposal are primarily the sheet, although other devices can also be used to influence the sail and the air flow around it. Apart from the sheet, an influence is also brought to bear by the tension in the halyard and the leech line, a Cunningham, if present, and the tightening of the kick tackle, and the tension along any boom, etc. The curve of the mast also has a part to play in sails of the kind which sit along a mast, and in many cases the mast can be adjusted when under way. The principle of the invention is exemplified in the following with the sheet alone, since this is still the most significant factor, although the invention is not restricted to this.

For the sail, the position of the clew (the attachment point of the sheet to the sail) and the direction of the sheet force are entirely critical for the air flow around the sail. The sail needs to exhibit the correct angle to the wind in order for it to achieve a good draught effect without slowing down the boat or causing an unnecessary careening moment. The matter is complicated by the fact that the wind has a variable speed and direction at different heights above the surface of the water. The sail is also pliable and adapts to the forces acting upon it. An attempt is made to achieve the best form for the sail and the best flow over the sail by selecting the position of the clew by taking in more or less of the sheet and by selecting the right direction of the sheet force, for example by moving the point of attachment of the sheet to the boat, or by adapting the distribution of the forces between double sheets. In the case of a staysail, the point of attachment of the sheet to the boat is adapted both across the beam and in the fore-and-aft direction of the boat. When under sail, however, the position of the attachment point is varied for the most part in the fore-and-aft direction. For a sail on a boom, the attachment of the sheet is varied in the same way in the lateral sense of the boat. In both cases, the aim is to adapt the rotation or twisting of the sail from its lower part to its upper part so that the sail will adapt as closely as possible to the wind conditions as they vary with the height above the surface of the water. The rotation is increased by shifting the attachment point of the sheet to the boat rearwards for a staysail, or inwards towards the centre of the boat for a boom sail, and vice versa.

By comparing the actual flow around the sail with an ideal image, it is possible to decide whether the sail should have more or less sheet and more or less rotation. The decision can be made, with the help of the previously described image display, by the person who is sailing. It can also be made automatically in the central unit and made available to the sailor as advice in the form of text or other symbols in the image. The sailor can then carry out the appropriate corrections manually.

In a fully developed system, the information can also be used for the automatic correction of the setting of the sail. Impulses from the central unit are then able to influence motor-driven winches, which set the sail automatically so that the flow pattern around it is as good as possible. It is then possible to speak of intelligent sails.

The above description describes the invention applied to a single sail. Most yachts have multiple sails. The image display can then show images of the flow around all the sails. The sails influence one another, and a change to the setting of one sail then also has an influence on the other sails. By comparing the current situation around the sails with the ideal conditions stored in the central unit, it is also possible to draw conclusions in respect of how the sail system as a whole can be optimized. These conclusions can be presented to the sailor in the image and can also be used for automatic measures. It is now possible to speak of an intelligent sail system.

The invention is naturally not restricted to the embodiment described above. Modifications are possible, in particular in respect of the nature of the various parts, or by the use of comparable technologies, but without for that reason departing from the area of protection afforded in the Patent claims.

The invention claimed is:

1. System adapted for sailors in order to determine the air flow conditions around one or more sails, in conjunction with which both sides of the sails are equipped with a number of sensors that are mounted on and distributed over the surface thereof and communicate the flow conditions in their vicinity to a central unit, characterized in that the surfaces of the sail are provided with ultrasonic sensors which indicate the direction and velocity of the air flow at points at which they are mounted.

2. System in accordance with claim 1, characterized in that the flow around the sail is presented on an image of the sail.

3. System in accordance with claim 2, characterized in that the image shows the direction of the air flow around the sensors in the form of arrows, whose direction indicates the direction of the air flow and whose length indicates the velocity of the air flow.

4. System in accordance with claim 2, characterized in that the image shows how telltales on the sail at the location of the sensors would have been oriented.

5. System in accordance with claim 2, characterized in that the flow on both sides of the sails is shown in the image in different colours.

6. System in accordance with claim 2, characterized in that the image also includes advice in respect of how the setting of the sail may be changed in order to impart a better function to the sails.

7. System in accordance with claim 1, characterized in that the information from the sensors is used for the automatic correction of the sail setting in order to achieve the optimal function of the sails.

8. System in accordance with claim 1, characterized in that the ultrasonic sensors are capacitive micromechanical sensors.

9. System in accordance with claim 1, characterized in that the transmission from the sensors to the central unit takes place with the help of electrical wires along the sail.

10. System in accordance with claim 1, characterized in that the transmission from the sensors to the central unit takes place by wireless means.

* * * * *